Aug. 22, 1967   H. P. FOCHLER   3,336,950
CULVERT CONSTRUCTION
Filed May 19, 1964   3 Sheets-Sheet 1

INVENTOR.
HELMUT P. FOCHLER.
BY
Isaac, Fetzer & Isaac
ATTORNEYS

Aug. 22, 1967  H. P. FOCHLER  3,336,950
CULVERT CONSTRUCTION
Filed May 19, 1964  3 Sheets-Sheet 2

INVENTOR.
HELMUT P. FOCHLER
BY
*Jeare, Jetzer & Jeare*
ATTORNEYS

United States Patent Office

3,336,950
Patented Aug. 22, 1967

3,336,950
CULVERT CONSTRUCTION
Helmut Paul Fochler, Chagrin Falls, Ohio, assignor, by mesne assignments, to Continental Oil Company, a corporation of Delaware
Filed May 19, 1964, Ser. No. 368,478
4 Claims. (Cl. 138—121)

This invention relates in general to a culvert construction and more particularly to the provision of an improved corrugated culvert construction and to the method of making the same.

Corrugated culvert or pipe is useful in many industrial and/or commercial applications, particularly in the construction field for the conveyance of fluids or liquids from one area to another. Such corrugated culvert or pipe has heretofore been of a generally endless cylindrical construction made from more or less rigid, corrosion resistant materials, such as galvanized sheet metal or the like. The endless, cylindrical construction of such conventional culvert or pipe has presented appreciable difficulty in normal application thereof due to the considerable waste of material which has heretofore resulted from cutting the culvert or pipe to various desired lengths at the point of application or installation. In addition, such endless, cylindrical culvert or pipe construction has resulted in substantial storage, transportation and handling costs due to the excessive volumetric space heretofore occupied by such conventional constructions.

Generally, the present invention provides an improved, unitary corrugated culvert or pipe and method of making the same which possess high strength and particularly good crush-resistance characteristics which can be economically and facilely produced by mass production techniques, which can be compactly stored and transported within minimum space requirements, and which can thereafter be quickly and easily assembled with a minimum of effort at the place of application or installation thereof.

Accordingly, an object of the present invention is to provide an improved corrugated culvert or pipe structure of the character described which is made from polymeric materials which is of a partially open formation that can be compactly stored and transported within minimum space requirements, and which can thereafter be facilely bent into generally cylindrical form and fastened together at the place of application or installation to provide an endless cylindrical corrugated culvert or pipe for use in the conveyance of materials.

A still further object of the present invention is to provide an improved corrugated culvert or pipe structure of the character described which is made from a single, corrugated sheet of polymeric material, which can be compactly stored and handled within minimum space requirements, and which can thereafter be readily transported to place of application or installation and facilely bent into an endless cylindrical corrugated culvert or pipe structure for use in the conveyance of material.

An additional object of the present invention is to provide an improved corrugated culvert or pipe structure of the character described which includes means at the opposed ends thereof for coupling one or more similar type corrugated culvert or pipe structure together to provide a system for the conveyance of fluid, liquids or the like, from one area to another.

A still further object of the present invention is to provide a method for making the improved corrugated culvert or pipe structure of the character described.

Other features and advantages of the invention will be apparent from the following description taken in conjunction with the accompanying drawings wherein.

Referring now again to the drawings, and in particular to FIGS. 1 to 6 thereof, there is illustrated generally at 10 a corrugated culvert or pipe structure for the use in conveyance of fluid liquids or the like from one area to another. The corrugated structure 10 in the embodiment shown is preferably made, such as by suitable molding techniques as shown in the art. The polymeric material may include any suitable thermoplastic material or polymer, such as for instance polyethylene or rubber modified styrene having more or less non-elastic properties. Other polymeric materials such as nylon or plasticized polyvinyl chloride may also be utilized.

In the embodiment shown, the corrugated culvert or pipe structure 10 is generally of an elongated construction which is open at both of its opposed distal ends 12 and 14 thereof. The structure 10 in the embodiment shown is preferably molded in a partially radially open formation as indicated generally at 16 of FIGS. 1 and 2.

Figure 2:
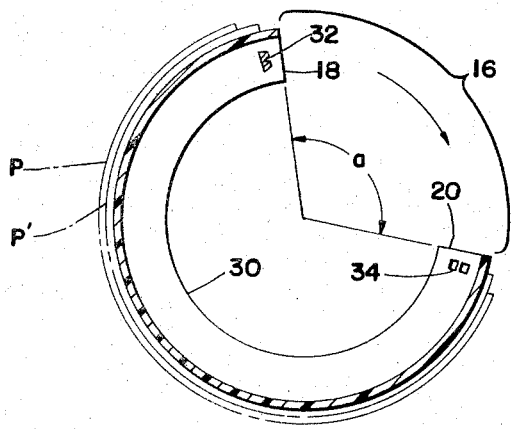
FIG. 2 is a vertically sectional view taken along the plane of line 2—2 of FIG. 1.

As shown at FIG. 2, the partially radially open formation 16 defines a generally non-circular configuration in cross section which provides a pair of spaced, oppositely disposed generally longitudinally extending edges 18 and 20. The opposed longitudinally extending edges 18 and 20 are spaced apart by an amount sufficient, as indicated by the angle (a), to provide the desired degree of open formation throughout the length of the structure. In the embodiment shown, it is preferred that the angle (a) of open formation be approximately 90°. Thus, it can readily be seen that an important advantage of such partially open structural formation resides in the fact that any number of similarly formed corrugated structures can be assembled together for the purpose of storage and shipment.

As diagrammatically illustrated in the broken showing of FIG. 2, a plurality of other similarly formed corrugated culvert or pipe structure P and P' can readily be assembled in stacked relation about and/or accomodated in stacked relation within the partially opened corrugated structure 10 and which due to the resilient haracteristics of the polymeric material will be firmly etained together in such stacked relation during normal seage thereof. Moreover, with this improved arrangement any number and various sizes of similarly corrugated structures can be compactly arranged for storage, transportation and handling within minimum space requirements and with a substantially reduced cost and effort.

As shown, the corrugated structure 10 is formed with plurality of integral, symmetrical corrugations 22 extending along its length thereof. As best shown in cross ection at FIG. 6, each corrugation preferably includes pair of generally planar side walled portions 24 and 26 vhich extend between crest portions 28 and trough portions 30. Such portions together defining a plurality of enerally arched-shaped structures extending throughout he length of the structure to provide the major crushesistance characteristics to the finalized corrugated structure.

The embodiment shown, the corrugated structure 10 is referably provided with a plurality of spaced, locking ingers or retainer lugs 32 extending inwardly from the nner surface thereof, and disposed along one longitudinal dge 18 thereof. The retainer lugs 32 are adapted to nterlock with openings or slots 34 which are disposed long the other longitudinal edge 20 of the structure. As best shown in cross section at FIG. 5, each retainer ug 32 is preferably of a generally triangular shaped coniguration including a generally radially extending, planar abutment surface 36 for engagement with a corresponding abutment surface presented by each of the respective lots 34.

Figure 1:
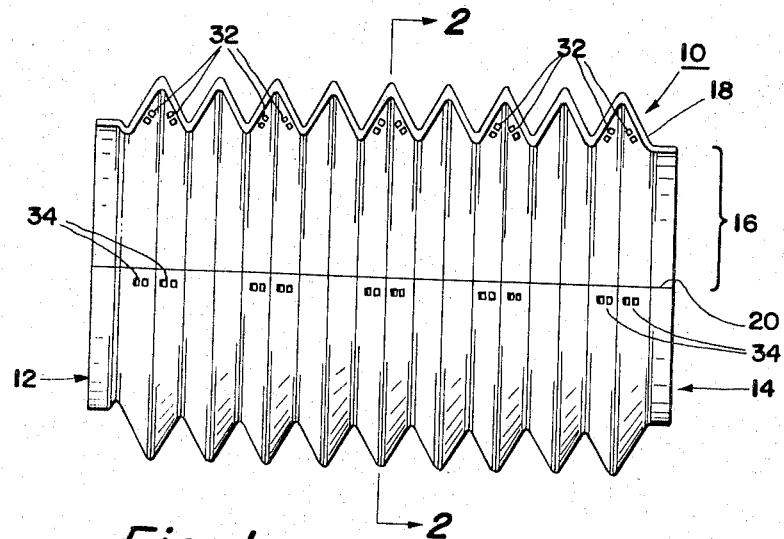
FIG. 1 is a side elevation view showing the partially open formation of the improved corrugated culvert or pipe structure made in accordance with the present invention.
Figure 3:
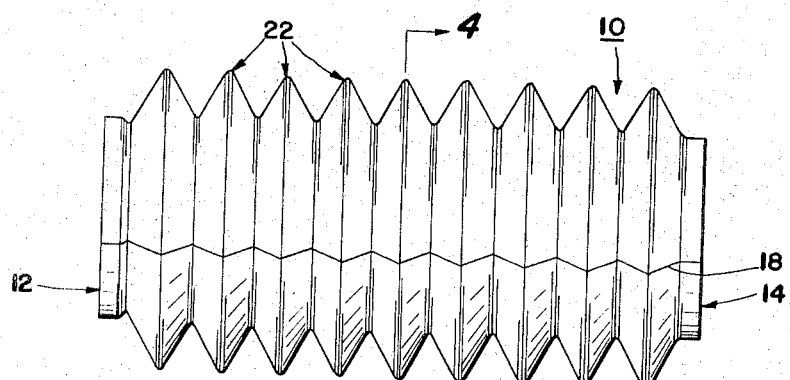
FIG. 3 is a side elevation view showing the improved corrugated culvert or pipe structure of the present invention in its closed and fastened position ready for use in the conveyance of material.
Figure 4:
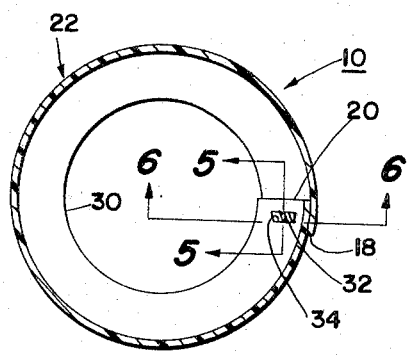
FIG. 4 is a vertical sectional view taken along the plane of line 4—4 of FIG. 3.
Figure 5:
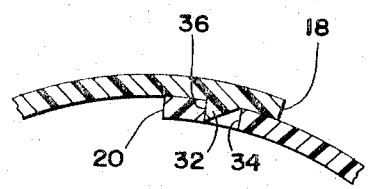
FIG. 5 is an enlarged fragmentary vertical section view taken along the plane of line 5—5 of FIG. 4, and showing the overlapping and interlocked relationship between the opposed longitudinal edges of the culvert or pipe structure.
Figure 6:
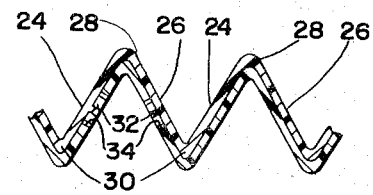
FIG. 6 is an enlarged fragmentary longitudinal section view taken along the plane of line 6—6 of FIG. 4.

In assembly of the corrugated structure 10, the opposed ongitudinally extending edges 18 and 20 are brought together until they are disposed in overlapping relationship, as best shown in FIGS. 3 and 4. As the opposed longitudinally extending edges 18 and 20 are brought together, the retainer lugs 32 are snapped into the coacting slots 34. In this finalized bent or closed condition of the structure, the planar abutment surfaces 36 of the respective retainer lugs 32 are disposed in surface-to-surface engagement with the corresponding abutment surfaces presented by the respective slots 34. Thus, due to the elastic memory of the polymeric material comprising the structure, the opposed longitudinally extending edges 18 and 20 are effectively disposed and retained in overlapping circumferential interlocked relationship to provide the finalized endless, cylindrical form illustrated in FIG. 4.

Figure 7:
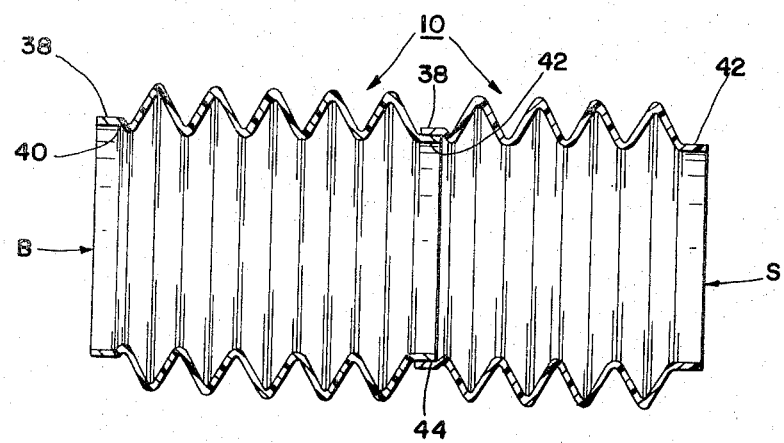
FIG. 7 is a longitudinal section view illustrating two of the improved corrugated culvert or pipe structures of the present invention coupled together in end-to-end relationship.

In the embodiment shown, the corrugated structure 10 is preferably further provided adjacent one end with a bell B and adjacent its other end with a spigot S construction (FIG. 7) for joining together one or any number of similar such corrugated structures. The bell construction B in the form shown includes an integral flange 38 forming an extension of the corrugated structure. The flange is bent upwardly and outwardly, as at 40, from the interior surface thereof by an amount sufficient to tightly, yet slidably receive therein the spigot end of a correspondingly formed corrugated structure. The spigot construction S in the form shown includes an integral flange 42 which extends outwardly forming an extension of the inner surface of the corrugated structure. The flange 42 is of a somewhat lesser diameter compared to that of the flange 38 so that the flange 42 may be tightly, yet slidably disposed therein for coupling the corrugated structures together, as aforesaid. If desired, a suitable adhesive may be applied between the flange 38 and 42, as at 44 to provide an effective seal against the entry of foreign or of deleterious materials into the system, and to hold the structures together in end-to-end relationship.

Figure 8:
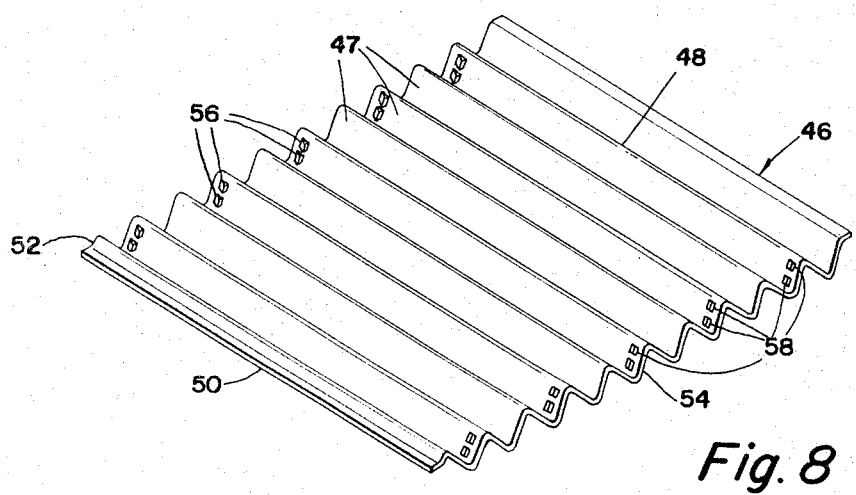
FIG. 8 is a generally perspective view of a single corrugated sheet of polymeric material for making the improved corrugated culvert or pipe structure in accordance with another form of the present invention.
Figure 10:
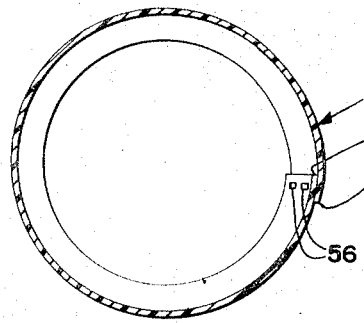
FIG. 10 is an enlarged vertical sectional view of the improved corrugated culvert or pipe structure of FIG. 9.

In the embodiment shown in FIGS. 8 and 10, inclusive, the corrugated culvert or pipe structure, designated generally at 10a, is generally similar to that illustrated in FIGS. 1 to 7, inclusive, except that in this form, the structure is preferably made from a single, generally flat sheet 46 of polymeric material which has a plurality of symmetrically arranged corrugations 47 thereon to provide the major crush-resistance characteristics in the finalized corrugated structure.

As shown, the corrugated sheet 46 is preferably of a polygonal shaped configuration, such as rectangular shaped, to provide a pair of oppositely disposed transversely extending edges 48 and 50 and a pair of oppositely disposed longitudinally extending edges 52 and 54. The corrugated sheet in the embodiment shown in provided along one longitudinal edge 52 with a plurality of the aforementioned type of locking fingers or retaining lugs 56 adapted to interlock with openings or slots 58 disposed along the outer longitudinal edge 54 for the purpose of fastening the corrugated structure together in its finalized endless, cylindrical form.

Figure 9:
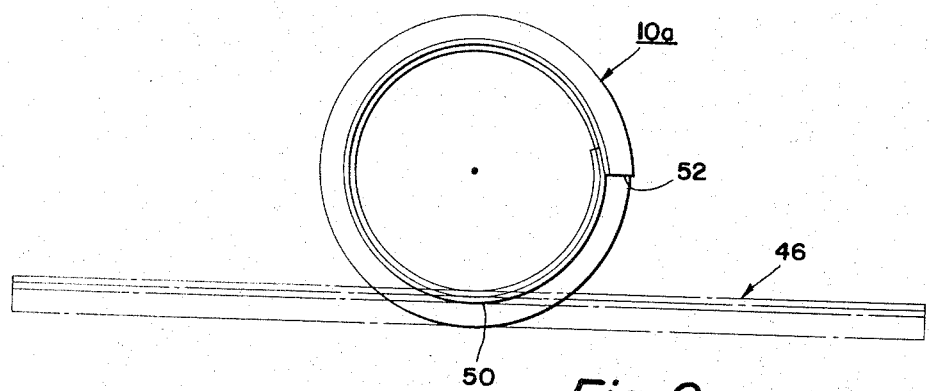
FIG. 9 is a generally perspective view showing the single, corrugated sheet of FIG. 8 bent into cylindrical form and fastened together to provide the improved corrugated culvert or pipe structure of the present invention.

In this form, and as best shown in FIG. 9, the corrugated culvert or pipe 10a is formed by directly bending the corrugated sheet 45 in a direction which is generally transverse to the direction of extension of corrugations 47 so that in the finalized cylindrical form, as illustrated in FIG. 9, the corrugations 47 are disposed substantially transverse to the longitudinal central axis X—X of the structure. Hence, the corrugated sheet 46 is bent until the opposed longitudinally extending edges 52 and 54 are brought together and into circumferential overlapping relationship. As the opposed longitudinally extending edges 52 and 54 are brought together, the retainer lugs 56 are snapped into the coacting slots 58 which due to the elastic memory of the polymeric material effectively retains the longitudinally extending edges 52 and 54 in circumferentially overlapping relationship to provide the finalized cylindrical form illustrated in FIG. 10. Thus, it can readily be seen that any number and/or various sizes of the generally flat, corrugated sheets can be stacked one on top of the other to provide an extremely compact arrangement for the transportation to a place of ultimate application or installation. Moreover, at the place of usage, the stacked corrugated sheets can be quickly and facilely cut to the desired predetermined length and directly bent and fastened together into the finalized cylindrical form for use in the conveyance of the material, such as fluids, liquids or the like, from one area to another.

From the foregoing description and accompanying drawings, it will be seen that due to the partially open or substantially flat initial structural formation of the corrugated structure, the present invention enables a number of similarly conformed structures to be facilely and compactly stacked together thereby substantially reducing the cost of storage, transportation and handling, either at the point or origin and/or at the place of ultimate installation thereof. Furthermore, at the ultimate place of usage, such improved corrugated structure can be quickly bent and/or cut into the finalized cylindrical form with a minimum of waste and manual effort. By the present invention, any number of similarly formed corrugated structures can be facilely coupled together in end-to-end relation to provide a system for the conveyance of fluid, liquids or the like, from one area to another. In addition, by such partially open or initially flat structural formation, the improved corrugated pipe or culvert structure of the present invention may be advantageously utilized as a protective cover or shield for conventional types of pipe or tubing, such as those made from plastic materials, to prevent radial crushing and/or axial distortion of the same due to the shifting and changing contour of the supporting, as when buried in the earth, concrete or the like.

The terms and expressions which have been used are terms of description and not of limitation and there is no intention in the use of such terms and expressions of excluding any equivalents of the features shown or described, or portions thereof, but it is recognized that various modifications are possible within the scope of the invention claimed.

I claim:

1. A unitary, high strength, crush-resistant culvert product for use in the conveyance of fluid materials comprising, a curved body made from a sheet of resilient polymeric material, said sheet being of a uniform thickness and formed to have a plurality of longitudinally spaced corrugations extending transversely around the periphery thereof to provide axial rigidity and radial crush-resistant characteristics, said body being curved in a substantially circular arc and extending circumferentially at least 180 degrees, defining a pair of oppositely disposed side edges extending longitudinally thereof and a pair of oppositely disposed substantially parallel end edges extending transversely thereof, said side edges being spaced apart to receive a predetermined number of similarly formed culvert products in stacked relation, said body including a plurality of retainer means for joining the side edges together in locked relationship and operative in response to the elastic memory of the material when in the closed position to hold the body in a generally circular shape in the closed position thereof.

2. A culvert product in accordance with claim 1, wherein said retainer means includes a plurality of lug members disposed adjacent one longitudinally extending side edge adapted to be coactingly received in corresponding openings disposed adjacent the other longitudinally extending side edge.

3. A culvert product in accordance with claim 2, wherein said lug members are polygonal in cross-section and have a radial thickness substantially equal to the thickness of said sheet, whereby when the lugs are inserted through said openings they are disposed in substantially flush relationship with respect to the interior surface of said body.

4. A culvert product in accordance with claim 1, wherein said side edges are disposed in parallel and overlapping relation in the closed position of said body.

References Cited

UNITED STATES PATENTS

| | | | |
|---|---|---|---|
| 900,039 | 9/1908 | Schlafly | 138—173 X |
| 942,466 | 12/1909 | Schnuerer | 138—173 X |
| 1,005,656 | 10/1911 | Sanders | 138—173 X |
| 2,262,758 | 11/1941 | Erne | 138—166 X |
| 2,393,168 | 1/1946 | Jackes et al. | 138—121 |
| 2,524,662 | 10/1950 | Harding | 138—121 |
| 2,782,805 | 2/1957 | Leadbetter | 138—168 |
| 3,038,205 | 6/1962 | Plummer | 138—128 X |

LAVERNE D. GEIGER, *Primary Examiner.*

SAMUEL ROTHBERG, *Examiner.*

C. L. HOUCK, *Assistant Examiner.*